United States Patent [19]

Renth et al.

[11] 3,859,438

[45] Jan. 7, 1975

[54] PHARMACEUTICAL COMPOSITIONS CONTAINING AN N-(1-BICYCLIC ARYL-PROPYL-2)-N-BICYCLIC ARYL-PIPERAZINE AND METHOD OF USE

[75] Inventors: Ernst Otto Renth; Anton Mentrup; Kurt Schromm, all of Ingelheim/Rhein; Rolf Giesemann, Biberach a.d. Riss, all of Germany

[73] Assignee: Boehringer Ingelheim G.m.b.H., Ingelheim/Rhein, Germany

[22] Filed: Nov. 21, 1973

[21] Appl. No.: 417,884

Related U.S. Application Data

[62] Division of Ser. No. 160,891, July 8, 1971, Pat. No. 3,808,212.

[52] U.S. Cl. .............................. 424/250
[51] Int. Cl. ............................ A61u 27/00
[58] Field of Search ..................... 424/250

[56] References Cited
UNITED STATES PATENTS

| | | | |
|---|---|---|---|
| 2,909,523 | 10/1959 | Bach | 260/268 BQ |
| 3,119,826 | 1/1964 | Regnier | 260/268 BQ |
| 3,119,826 | 1/1964 | Regnier et al. | 260/268 BQ |
| 3,362,956 | 1/1968 | Archer | 260/268 BQ |
| 3,419,560 | 12/1968 | Bernstein | 260/268 BQ |
| 3,472,853 | 10/1969 | Archer | 260/268 BQ |
| 3,562,277 | 2/1971 | Hansen | 260/268 BQ |
| 3,585,193 | 6/1971 | Regnier et al. | 260/268 BQ |
| 3,729,474 | 4/1973 | Mentrup | 260/268 BQ |

*Primary Examiner*—Stanley J. Friedman
*Attorney, Agent, or Firm*—Hammond & Littell

[57] ABSTRACT

Pharmaceutical compositions containing as an active ingredient a compound of the formula

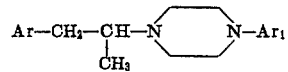

wherein Ar and $Ar_1$, which may be identical or different from each other, are each bicyclic aromatic fused-ring radicals, where the ring not directly attached to the methylene group or the nitrogen, atom of the piperazine nucleus, respectively, is an isocyclic or heterocyclic, saturated or unsaturated ring, preferably 3,4-methylenedioxyphenyl, indanyl, tetrahydronaphthyl, naphthyl, 1,4-benzodioxanyl or chromanyl, or a non-toxic, pharmacologically acceptacle acid addition salt thereof; the compositions are useful as central nervous system depressants, adrenolytics, antiphlogistics and antihistamines.

8 Claims, No Drawings

PHARMACEUTICAL COMPOSITIONS CONTAINING AN N-(1-BICYCLIC ARYL-PROPYL-2-N-BICYCLIC ARYL-PIPERAZINE AND METHOD OF USE

This is a division of copending application Ser. No. 160,891, filed July 8, 1971, now U.S. Pat. No. 3,808,212, issued Apr. 30, 1974.

This invention relates to novel pharmaceutical compositions containing as an active ingredient an N-(1-bicyclic aryl-propyl-2)-N'-bicyclic aryl-piperazine or a non-toxic acid addition salt thereof, as well as to methods of using said piperazine compounds as central nervous system depressants, adrenolytics, antiphlogistics and antihistamines.

More particularly, the present invention relates to novel pharmaceutical compositions containing as an active ingredient a piperazine derivative of the formula

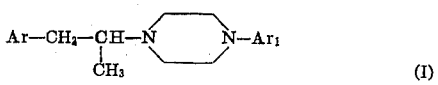

(I)

wherein Ar and $Ar_1$, which may be identical or different from each other, are each bicyclic aromatic fused-ring radicals, where the ring not directly attached to the methylene group or the nitrogen atom of the piperazine nucleus, respectively, is an isocyclic or heterocyclic, saturated or unsaturated ring, preferably 3,4-methylenedioxyphenyl, indanyl, tetrahydronaphthyl, naphthyl, 1,4-benzodioxanyl or chromanyl, or a non-toxic, pharmacologically acceptable acid addition salt thereof.

The compounds embraced by formula I above may be prepared by various methods involving known chemical synthesis principles, among which the following have proved to be particularly convenient and efficient.

Method A

By reacting an N-bicyclic aryl-piperazine of the formula

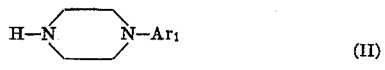

(II)

wherein $Ar_1$ has the same meanings as in formula I, with an electrophilic, racemic or optically active compound of the formula

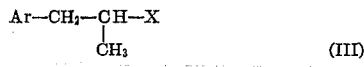

(III)

wherein Ar has the same meanings as in formula I and X is chlorine, bromine, lower alkyl-sulfonyloxy or aryl-sulfonyloxy, in the presence of an acid-binding agent, such as sodium carbonate or potassium carbonate.

Method B

By reacting an N-bicyclic aryl-piperazine of the formula II above with a 1-bicyclic aryl-propanone-2 of the formula

(IV)

wherein Ar has the same meanings as in formula I, in the presence of catalytically activated hydrogen.

Method C

By reacting a racemic or optically active N-(1-bicyclic aryl-propyl-2)-N'-bicyclic aryl-ethylenediamine of the formula

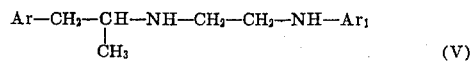

(V)

wherein Ar and $Ar_1$ have the same meanings as in formula I, with a compound of the formula

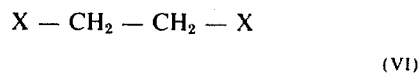

(VI)

wherein X has the same meanings as in formula III, such as a dihaloethane, and especially dibromoethane, in the presence of an acid-binding agent at elevated temperatures.

The starting compounds required for methods A, B and C are, to a large extent, known compounds or may be prepared by known methods.

A compound of the formula II, for instance, may be prepared by the processes described in J.A.C.S. 76, 1853 (1954) and J. Med. Chem. 8, 332 (1965).

An electrophilic 1-bicyclic aryl-propyl -2 compound of the formula III may be obtained by esterification of a corresponding 1-bicyclic aryl-propanol-2 (see Examples 8 and 9 below).

A 1-bicyclic aryl-propanone-2 of the formula IV may, for instance, be prepared by the process described in Org. Synth. Coll., Vol. IV, page 573, and reduction of the same with lithium aluminum hydride yields the corresponding 1-bicyclic aryl-propanol-2 needed for the preparation of a compound of the formula III.

A compound of the formula V may, for example, be prepared by the processes described in German Auslegeschrift 1,212,973.

Finally, a compound of the formula VI may be obtained by esterification of ethylene glycol, or by addition of halogen to ethylene, or by halogenation of ethane.

The compounds of the formula I comprise an assymmetric carbon atoms in the —$CH(CH_3)$— grouping and, accordingly, occur in the form of racemates as well as optically active antipodes. The optically active compounds may be obtained either by using the corresponding optically active starting compounds III, IV or V in methods, A, B or C, respectively, or by converting a racemate of a compound of the formula I into a diastereo-salt thereof with the aid of an optically active auxiliary acid, such as dibenzoyl-D-tartaric acid or D-3-bromo-camphor-8-sulfonic acid, and separating the optically active components by fractional precipitation or fractional crystallization, pursuant to conventional procedures.

The racemates and optically active antipodes of the compound of the formula I are organic bases and therefore form acid addition salts with inorganic or organic acids. Examples of non-toxic, pharmacologically acceptable acid addition salts are those formed with hydrochloric acid, hydrobromic acid, sulfuric acid, methanesulfonic acid, succinic acid, tartaric acid, 8-chlorotheophylline or the like.

The following examples illustrate the preparation of compounds embraced by formula I.

EXAMPLE 1

N-[1-(Indanyl-5')-propyl-2]-N'-(α-naphthyl)-piperazine and its monohydrochloride by method A A mixture consisting of 84 gm of 1-(indanyl-5')-propyl-2-methanesulfonate, 65 gm of N-(α-naphthyl)-piperazine, 64 gm of anhydrous sodium carbonate and 500 ml of xylene was refluxed for four hours. Thereafter, the reaction mixture was vacuum-filtered to separate the insoluble inorganic salts which had formed, the filtrate was evaporated in vacuo, and the residue was admixed with methanol and aqueous hydrochloric acid. The crystalline slurry formed thereby was vacuum-filtered, and the filter cake was recrystallized from aqueous methanol, yielding the compound of the formula

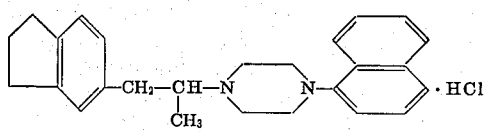

having a melting point of 300°–304°C.

The free base, which was obtained by treating the monohydrochloride with ammonia, had a melting point of 90°–91°C.

EXAMPLE 2

N-[1-(β-5,6,7,8-tetrahydronaphthyl)-propyl-2]-N'-(α-naphthyl)-piperazine monohydrochloride by method A A mixture consisting of 54 gm of 1-(β-5,6,7,8-tetrahydronaphthyl)-propyl-2 methanesulfonate, 38 gm of N-(α-naphthyl)-piperazine, 38 gm of anhydrous sodium carbonate and 300 ml of xylene was refluxed for four hours. Thereafter, the reaction mixture was vacuum-filtered to separate the insoluble inorganic salts which had formed, the filtrate was evaporated in vacuo, and the residue was admixed with methanol and aqueous hydrochloric acid. The resulting crystalline slurry was vacuum-filtered, and the filter cake was recrystallized from aqueous methanol, yielding the compound of the formula

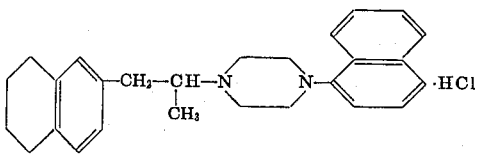

having a melting point of 306°–309°C.

EXAMPLE 3

N-[1(α-naphthyl)-propyl-2]-N'-(α-naphthyl)-piperazine monohydrochloride by method A A mixture consisting of 29 gm of 1-(α-naphthyl)-propyl-2 methanesulfonate, 21 gm of N-(α-naphthyl)-piperazine, 22 gm of anhydrous sodium carbonate and 250 ml of xylene was refluxed for four hours. Thereafter, the reaction mixture was vacuum-filtered to remove the insoluble inorganic salts which had formed, the filtrate was evaporated in vacuo, and the residue was admixed with methanol and aqueous hydrochloric acid. The resulting crystalline slurry was vacuum-filtered, and the filter cake was recrystallized from methanol, yielding the compound of the formula

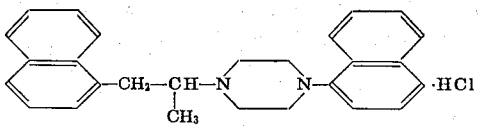

having a melting point of 325°–327°C.

EXAMPLE 4

N-[1-(3',4'-methylenedioxy-phenyl)-propyl-2]-N'-(β-5,6,7,8-tetrahydronaphthyl)-piperazine monohydrochloride by method A A mixture consisting of 28 gm of N-(β-5,6,7,8-tetrahydronaphthyl)-piperazine (b.p. 140°C at 0.15 mm Hg), 39 gm of 1-(3',4'-methylenedioxy-phenyl)-propyl-2-methanesulfonate, 32 gm of anhydrous sodium carbonate and 250 ml of xylene was refluxed for five hours. Thereafter, the reaction mixture was vacuum-filtered, the solvent was distilled out of the filtrate in vacuo, and the residue was admixed first with methanol and then with aqueous hydrochloric acid to pH2. The precipitate formed thereby was separated by vacuum filtration, and the filter cake was recrystallized from methanol, yielding the compound of the formula

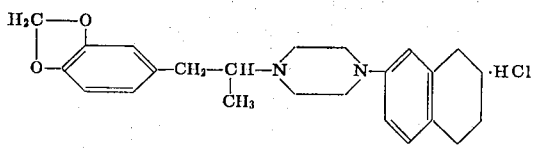

having a melting point of 251°–253°C.

EXAMPLE 5

N-[1-(Chromanyl-6')-propyl-2]-N'-(α-naphthyl)-piperazine monohydrochloride by method A A mixture consisting of 30 gm of 1-(chromanyl-6')-propyl-2 methanesulfonate, 22 gm of N-(α-naphthyl)-piperazine, 22 gm of anhydrous sodium carbonate and 250 ml of xylene was refluxed for four hours. Thereafter, the reaction mixture was vacuum-filtered to remove insoluble inorganic salts which had formed, the filtrate was evaporated in vacuo, and the residue was admixed with methanol and aqueous hydrochloric acid. The resulting crystalline slurry was vacuum-filtered, and the filter cake was recrystallized from aqueous methanol, yielding the compound of the formula

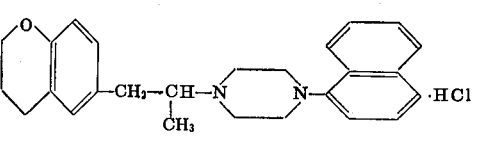

having a melting point of 324°–325°C.

EXAMPLE 6

N-[1-(1', 4'-benzodioxanyl-6')-propyl-2]-N'-(β-naphthyl)-piperazine monohydrochloride by method A A mixture consisting of 60 gm of 1-(1', 4'-benzodioxanyl-6')-n-propyl-2 methanesulfonate, 42 gm of N-(β-naphthyl)-piperazine, 42 gm of anhydrous sodium carbonate and 300 ml of xylene was refluxed for four hours. Thereafter, the reaction mixture was vacuum-filtered to remove the insoluble inorganic salts which had formed, the filtrate was evaporated, and the residue was admixed with methanol and aqueous hydrochloric acid. The resulting crystalline slurry was vacuum-filtered, and the filter cake was recrystallized from methanol, yielding the compound of the formula

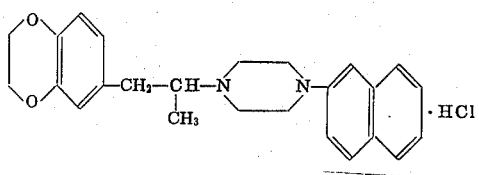

having a melting point of 239°–241°C.

EXAMPLE 7

N-[1-(β-naphthyl)-propyl-2]-N'-(α-naphthyl)-piperazine monohydrochloride by method A A mixture consisting of 33 gm of 1-(β-naphthyl)-propyl-2-methanesulfonate, 22 gm of N-(α-naphthyl)-piperazine, 22 gm of anhydrous sodium carbonate and 300 ml of xylene was refluxed for four hours. Thereafter, the insoluble inorganic salts which had formed were separated by vacuum filtration, the filtrate was evaporated, and the residue was admixed with methanol and aqueous hydrochloric acid. The resulting crystalline slurry was vacuum-filtered, and the filter cake was recrystallized from methanol, yielding the monohydrochloride of N-[1-(β-naphthyl)-propyl-2]-N'-(α-naphthyl)-piperazine, m.p. 290°–291°C.

EXAMPLE 8

N-[1-(3', 4'-methylenedioxy-phenyl)-n-propyl-2]-N'-(β-indanyl)-piperazine monohydrochloride by method A a. 107 gm of 1-(3', 4'-methylenedioxy-phenyl)-propanone-2 were reduced in ethanol with 14.2 gm of sodium borohydride, yielding 1-(3', 4'-methylenedioxy-phenyl)-propanol-2 (b.p. 153°–156°C at 14 mm Hg), which in turn was reacted with p-toluene-sulfonic acid chloride in pyridine, yielding 1-(3', 4'-methylenedioxy-phenyl)-propyl-2 p-toluenesulfonate, b.p. 58°C.

b. A mixture consisting of 35.6 gm (0.11 mol) of 1-(3', 4'-methylenedioxy-phenyl)propyl-2 p-toluenesulfonate, 20.1 gm (0.1 mol) of N-(β-indanyl)-piperazine, 21.2 gm (0.2 mol) of anhydrous sodium carbonate and 250 ml of xylene was refluxed for five hours. Thereafter, the insoluble inorganic salts which had formed were separated by vacuum filtration, the solvent was distilled out of the filtrate in vacuo, the residue was stirred with dilute hydrochloric acid, the mixture was vacuum-filtered, and the filter cake was recrystallized from methanol, yielding the compound of the formula

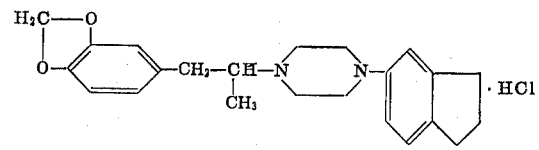

having a melting point of 266°–268°C.

EXAMPLE 9

N-[1-(1', 4'-benzodioxanyl-6')-propyl-2]-N'-(α-naphthyl)-piperazine monohydrochloride by method A a. 76 gm of 1-(1', 4'-benzodioxanyl-6')-propanone-2 were reduced with 7.6 gm of sodium borohydride in ethanol to yield 1-(1', 4'-benzodioxanyl-6'(-propanol-2 (b.p. 120°–125°C at 0.1 mm Hg) which, in turn, was reacted with methanesulfonic acid chloride in pyridine to yield 1-(1', 4'-benzodioxanyl-6')-propyl-2 methanesulfonate, m.p. 49°–50°C.

b. A mixture consisting of 60 gm (0.22 mol) of 1-(1', 4'-benzodioxanyl-6')-propyl-2 methanesulfonate, 42.4 gm (0.2 mol) of N-(α-naphthyl)-piperazine, 42 gm (0.42 mol) of sodium carbonate and 300 ml of xylene was refluxed in a vessel provided with a water separator, accompanied by stirring. Thereafter, the insoluble inorganic salts which had formed were separated by vacuum filtration, the solvent was distilled out of the filtrate in vacuo, the residue was taken up in methanol, and the resulting solution was acidified with dilute hydrochloric acid. The precipitate formed thereby was collected by vacuum filtration and recrystallized from methanol, yielding the monohydrochloride of N-[1-(1', 4'-benzodioxanyl-6')-propyl-2]-n'-(α-naphthyl)-piperazine, m.p. 320°–324°C.

EXAMPLE 10

N-[1(3', 4'-methylenedioxy-phenyl)-propyl-2]N'-(β-naphthyl)-piperazine monohydrochloride by method B A mixture of 17.8 gm (0.1 mol) of (3,4-methylenedioxy-phenyl)-acetone, 21.2 gm (0.1 mol) of N-(β-naphthyl)-piperazine and 250 ml of ethanol was hydrogenated at 100°C and 50 atmospheres gauge in the presence of Raney nickel as a catalyst until no more hydrogen was being absorbed. Thereafter, the reaction mixture was allowed to cool, the catalyst was separated by vacuum filtration, and the ethanolic filtrate was admixed with concentrated hydrochloric acid until it reacted weakly acid. The precipitate formed thereby was collected by vacuum filtration, washed with water and ethanol, and recrystallized from methanol, yielding the compound of the formula

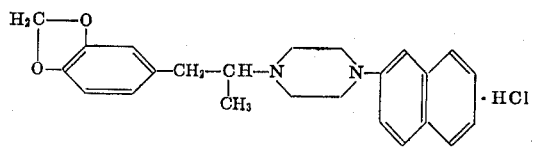

having a melting point of 210°–212°C.

EXAMPLE 11

N-[1-(3', 4'-methylenedioxy-phenyl)-propyl-2]-N'-(α-naphthyl)-piperazine monohydrochloride by method C a. 17.8 gm (0.1 mol) of (3,4-methylenedioxyphenyl)-acetone and 18.6 gm (0.1 mol) of N-(α-naphthyl)-ethylenediamine were dissolved in 200 ml of ethanol, and the solution was hydrogenated at 70°C and under pressure in the presence of palladized charcoal until no more hydrogen was being absorbed. Thereafter, the catalyst was separated by vacuum filtration, ahd the ethanol was distilled out of the filtrate. The residue was admixed with aqueous hydrochloric acid, the mixture was stirred for about 30 minutes, then vacuum-filtered, and the filter cake was thoroughly washed first with water and then with chloroform and finally recrystallized from aqueous methanol, yielding the monohydrochloride of N-(α-naphthyl)-N'-[(3', 4'-methylenedioxy-phenyl)-propyl-2]-ethylenediamine, m.p. 220°–221°C.

b. A mixture consisting of 19.2 gm (0.05 mol) of N-(α-naphthyl)-N'-[(3', 4'-methylenedioxy-phenyl)-propyl-2]-ethylenediamine monohydrochloride, 10 gm of 1,2-dibromoethane, 20 gm of potassium carbonate and 150 ml of butanol was refluxed for ten hours. Thereafter, aqueous hydrochloric acid was added to the reaction solution, the precipitate formed thereby was collected by vacuum filtration, washed thoroughly first with water and then with chloroform, and finally recrystallized from methanol, yielding the compound of the formula

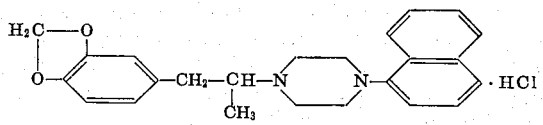

having a melting point of 288°–292°C.

The racemic or optically active compounds of the formula I and their non-toxic acid addition salts exhibit useful pharmacodynamic properties in warm-blooded animals, such as mice, dogs and rabbits.

More particularly, the compounds and their salts exhibit central nervous system depressing activities with very low toxicity and are therefore useful as sedatives, neuroleptics and tranquilizers.

In addition, the compounds and their salts exhibit adrenolytic activities and therefore have utility as hypotensives and bronchospasmolytics.

Moreover, the compounds of the formula I and their non-toxic acid addition salts exhibit antiphlogistic and anti-histaminic activities.

The compounds of the formula I and their non-toxic acid addition salts are surprisingly and unexpectedly better CNS-depressants than the structurally related compounds disclosed in German Auslegeschrift 1,189,553. Particularly effective CNS-depressants are those compounds of the formula I wherein Ar is a bicyclic fused ring system comprising a saturated oxygen-containing ring, such as 3,4-methylenedioxyphenyl, 1,4-benzodioxanyl or chromanyl, and $Ar_1$ is a bicyclic aromatic or homocyclic fused ring system, such as α-naphthyl, β-naphthyl or β-indanyl, and their non-toxic, pharmacologically acceptable acid addition salts.

Specific examples of compounds of the formula I which exhibit particularly effective CNS-depressing activities are the following:

N-[1-(3', 4'-methylenedioxy-phenyl)-propyl-2]-N'-(α-naphthyl)-piperazine,

N-[1-(3', 4'-methylenedioxy-phenyl)-propyl-2]-N'-(β-naphthyl)-piperazine,

N-[1-(3', 4'-methylenedioxy-phenyl)-propyl-2]N'-(β-indanyl)-piperazine,

N-[1-(1', 4'-benzodioxanyl-6')-propyl-2]-N'-(β-naphthyl)-piperazine,

N-[1-(chromanyl-6') -propyl-2']-N-(α-naphthyl)-piperazine and non-toxic, pharmacologically acceptable acid addition salts of these.

For pharmaceutical purposes the compounds of the formula I or a non-toxic acid addition salt thereof are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds of the formula I and their non-toxic acid addition salts is from 0.25 mg/kg to 3.4 mgm/kg body weight, preferably from 0.41 to 1.4 mgm/kg body weight.

The following examples illustrate a few dosage unit compositions comprising a compound of the formula I or a non-toxic acid addition salt thereof as an active ingredient and represent the best modes contemplated of putting the invention into practical use. The parts are parts by weight unless otherwise specified.

EXAMPLE 12

Tablets

The tablet composition is compounded from the following ingredients:

| | Parts |
|---|---|
| N-[1-(3', 4'-methylenedioxy-phenyl)-propyl -2]-N'-(α-naphthyl)-piperazine or its hydrochloride | 30 |
| Lactose | 70 |
| Corn starch | 93 |
| Secondary calcium phosphate | 47 |
| Soluble starch | 3 |
| Magnesium stearate | 3 |
| Colloidal silicic acid | 4 |
| Total | 250 |

Preparation

The piperazine compound, the lactose, the corn starch and the calcium phosphate are intimately admixed with each other, the mixture is moistened with an aqueous solution of the soluble starch, the moist mass is granulated through a fine-mesh screen, the granulate is dried, the dry granulate is admixed with the magnesium stearate and the colloidal silicic acid, and the resulting composition is compressed into 250 mgm-tablets in a conventional tablet-making machine. Each tablet contains 30 mgm of the piperazine compound and is an oral dosage unit composition with effective CNS-suppressing action.

EXAMPLE 13

Coated pills

The pill core composition is compounded from the following ingredients:

| | Parts |
|---|---|
| N-[1-(chromanyl-6')-propyl-2]-N'-(α-naphthyl)-piperazine, or its hydrochloride | 40 |
| Lactose | 50 |
| Corn starch | 80 |
| Secondary calcium phosphate | 50 |
| Soluble starch | 3 |
| Magnesium stearate | 3 |
| Colloidal silicic acid | 4 |
| Total | 250 |

Preparation

The ingredients are compounded in the same manner as for the tablet composition of the preceding example, and the composition is compressed into 250 mgm-pill cores, which are subsequently coated with a thin shell consisting essentially of a mixture of sugar, talcum and gum arabic. Each of the resulting coated pills contains 40 mgm of the piperazine compound and is also an oral dosage unit composition with effective CNS-suppressing action.

A dosage unit composition comprising a compound of the present invention as an active ingredient may, in addition, also contain another active ingredient, such as a spasmolytic and/or an analgesic, as illustrated by the following examples:

EXAMPLE 14

Tablets

The tablet composition is compounded from the following ingredients:

| | Parts |
|---|---|
| N-[1-(3',4'-methylenedioxy-phenyl)-propyl-2]-N'-(β-indanyl)-piperazine or its hydrochloride | 35 |
| (-)-N-Butylscopolammonium bromide | 25 |
| Lactose | 164 |
| Corn starch | 194 |
| Colloidal silicic acid | 14 |
| Polyvinylpyrrolidone | 6 |
| Magnesium stearate | 2 |
| Soluble starch | 10 |
| Total | 450 |

Preparation

The piperazine compound, the scopolammonium compound, the lactose, the corn starch and the polyvinylpyrrolidone are intimately admixed with each other, the mixture is moistened with an aqueous solution of the soluble starch, the moist mass is granulated through a fine-mesh screen, the granulate is dried and admixed with the magnesium stearate and the colloidal silicic acid, and the resulting composition is compressed into 450 mgm-tablets in a conventional tablet-making machine. Each tablet contains 35 mgm of the piperazine compound and 25 mgm of the scopolammonium compound and is an oral dosage unit composition with effective CNS-depressing and spasmolytic actions.

EXAMPLE 15

Suppositories

The suppository composition is compounded from the following

| | Parts |
|---|---|
| N-[1-(3',4'-methylenedioxy-phenyl)-propyl-2]-N'-(α-naphthyl)-piperazine or its hydrochloride | 30 |
| Methampyrone | 10 |
| Lecithin | 2 |
| Suppository base 30 cocoa butter) | 1790 |
| Total | 1832 |

Preparation

The piperazine compound, the methampyrone and the lecithin, all in finely divided form, are homogeneously distributed in the suppository base at about 40°C with the aid of an immersion homogenizer, and 1832 mgm-portions of the mixture are poured into cooled suppository molds. Each suppository contains 30 mgm of the piperazine compound and 10 mgm of methampyrone and is a rectal dosage unit composition with effective CNS-depressing and analgesic actions.

Analogous results are obtained when any one of the other piperazine compounds embraced by formula I or a non-toxic acid addition salt thereof is substituted for the particular piperazine compound in Examples 13 through 15. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A pharmaceutical dosage unit composition consisting essentially of an inert pharmaceutical carrier and an effective CNS-depressing amount of a compound of the formula

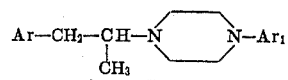

wherein
Ar is 3,4-methylenedioxy-phenyl, and
Ar$_1$ is naphthyl, tetrahydronaphthyl or indanyl, or a non-toxic, pharmacologically acceptable acid addition salt thereof.

2. A composition of claim 1, wherein said compound is N-[1-(3', 4'-methylenedioxy-phenyl)-propyl-2]-N'-(α-naphthyl)-piperazine or a non-toxic, pharmacologically acceptable acid addition salt thereof.

3. A composition of claim 1, wherein said compound is N-[1-(3', 4'-methylenedioxy-phenyl)-propyl-2]-N'-(β-naphthyl)-piperazine or a non-toxic, pharmacologically acceptable acid addition salt thereof.

4. A composition of claim 1, wherein said compound is N-[1-(3', 4'-methylenedioxy-phenyl)-propyl-2]-N'-(β-indanyl)-piperazine or a non-toxic, pharmacologically acceptable acid addition salt thereof.

5. The method of depressing the central nervous system of a warm-blooded animal, which comprises perorally, parenterally or rectally administering to said animal an effective CNS-depressing amount of a compound of the formula

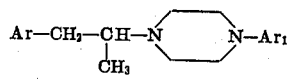

wherein
Ar is 3,4-methylenedioxy-phenyl, and
Ar$_1$ is naphthyl, tetrahydronaphthyl or indanyl, or a non-toxic, pharmacologically acceptable acid addition salt thereof.

6. The method of claim 5, wherein said compound is N-[1-3′, 4′-methylenedioxy-phenyl)-propyl-2-N′-($\alpha$-naphthyl)-piperazine or a non-toxic, pharmacologically acceptable acid addition salt thereof.

7. The method of claim 5, wherein said compound is N-[1-(3′, 4′-methylenedioxy-phenyl)-propyl-2]-N′-($\beta$-naphthyl)-piperazine or a non-toxic, pharmacologically acceptable acid addition salt thereof.

8. The method of claim 5, wherein said compound is N-[1-(3′, 4′-methylenedioxy-phenyl)-propyl-2]-N′-($\beta$-indanyl)-piperazine or a non-toxic, pharmacologically acceptable acid addition salt thereof.

* * * * *

FO-1050
(5/69)

UNITED STATES PATENT OFFICE
CERTIFICATE OF CORRECTION

Patent No. 3,859,438        Dated January 7, 1975

Inventor(s) ERNST OTTO RENTH, ANTON MENTRUP, KURT SCHROMM and ROLF GIESEMANN

It is certified that error appears in the above-identified patent and that said Letters Patent are hereby corrected as shown below:

Insert in Title Page

[30] Foreign Application Priority Data
            July 30, 1970   Germany ' P20 37 852.3

Col. 6, line 36:   "n'" should read -- N' --.

Col. 10, line 5:   correct "30" to read --e.g.--.

Signed and sealed this 8th day of April 1975.

(SEAL)
Attest:

RUTH C. MASON
Attesting Officer

C. MARSHALL DANN
Commissioner of Patents
and Trademarks